(12) United States Patent
Moradi

(10) Patent No.: US 12,298,427 B1
(45) Date of Patent: May 13, 2025

(54) RADAR SYSTEM WITH WAVELENGTH INDEPENDENT ANTENNA ARRAY

(71) Applicant: Sensoride Corporation, San Diego, CA (US)

(72) Inventor: Hassan Daniel Moradi, San Diego, CA (US)

(73) Assignee: Sensoride Corporation, San Diego, CA (US)

( * ) Notice: Subject to any disclaimer, the term of this patent is extended or adjusted under 35 U.S.C. 154(b) by 0 days.

(21) Appl. No.: 18/891,798

(22) Filed: Sep. 20, 2024

Related U.S. Application Data

(60) Provisional application No. 63/556,002, filed on Feb. 21, 2024.

(51) Int. Cl.
*G01S 7/03* (2006.01)

(52) U.S. Cl.
CPC ...................................... *G01S 7/03* (2013.01)

(58) Field of Classification Search
CPC ...... H01Q 21/06; H01Q 21/061; H01Q 21/08; G01S 7/03; G01S 13/931
See application file for complete search history.

(56) References Cited

U.S. PATENT DOCUMENTS

| | | | | |
|---|---|---|---|---|
| 10,564,277 B2* | 2/2020 | Hong | ..................... | G01S 13/003 |
| 11,280,879 B2* | 3/2022 | Hong | ..................... | G01S 13/343 |
| 11,997,455 B2* | 5/2024 | Cnaan | ................... | H01Q 21/061 |
| 12,099,110 B2* | 9/2024 | Achatz | ..................... | G01S 7/354 |
| 12,140,696 B2* | 11/2024 | Chen | ......................... | G01S 7/417 |
| 2019/0324136 A1* | 10/2019 | Amadjikpe | .............. | G01S 13/70 |
| 2020/0025906 A1* | 1/2020 | Kesaraju | .............. | G01S 13/931 |
| 2020/0256972 A1* | 8/2020 | Eckert | ..................... | G01S 13/86 |
| 2020/0333457 A1* | 10/2020 | Bialer | ..................... | G01S 7/352 |
| 2021/0296783 A1* | 9/2021 | Rostomyan | .......... | H01Q 1/2283 |
| 2021/0311180 A1* | 10/2021 | Wang | ..................... | G01S 13/538 |
| 2021/0377657 A1* | 12/2021 | Cnaan | ................... | A61B 5/4815 |
| 2022/0196798 A1* | 6/2022 | Chen | ...................... | G01S 7/354 |
| 2022/0214425 A1* | 7/2022 | Yoffe | .................... | G01S 13/931 |
| 2022/0283286 A1* | 9/2022 | Wu | ......................... | G01S 13/931 |
| 2022/0308166 A1* | 9/2022 | Orr | ......................... | G01S 7/417 |
| 2023/0269024 A1* | 8/2023 | Lee | .......................... | H04B 7/06 |
| | | | | 714/750 |
| 2023/0280455 A1* | 9/2023 | Jo | .......................... | G01S 13/62 |
| | | | | 342/25 R |
| 2023/0318662 A1* | 10/2023 | Jeon | ...................... | H04B 7/0413 |
| 2024/0142605 A1* | 5/2024 | Jeon | ...................... | G01S 13/931 |
| 2024/0192350 A1* | 6/2024 | Khang | ................... | G01S 13/931 |
| 2024/0302489 A1* | 9/2024 | Liu | ........................... | G06F 3/01 |

* cited by examiner

*Primary Examiner* — Peter M Bythrow
(74) *Attorney, Agent, or Firm* — FisherBroyles, LLP

(57) ABSTRACT

A radar system comprises a physical radar array comprising a plurality of physical transmit antennas, each configured to transmit a respective signal having a wavelength λ. The physical radar array further comprises a plurality of physical receive antennas, each configured to receive each of the respective signals. The radar system further comprises a neural network configured to receive data from the physical radar array and generate data corresponding to an emulated array of antennas, wherein a defined distance between each antenna of the emulated array of antennas is λ/2.

20 Claims, 11 Drawing Sheets

RADAR SYSTEM WITH WAVELENGTH INDEPENDENT ANTENNA ARRAY

CROSS REFERENCES TO RELATED APPLICATIONS

This application is related U.S. patent application Ser. No. 18/891,432 which is concurrently filed and commonly assigned. This application claims priority to U.S. Provisional Patent Application Ser. No. 63/556,002, for "RADAR SYSTEM WITH MACHINE LEARNING-ENHANCED ANTENNA ARRAY" filed Feb. 21, 2024, which is hereby incorporated by reference in its entirety for all purposes.

FIELD

The described embodiments relate generally to radar systems, such as arrays that employ one or more transmitters and one or more receivers. More particularly, the present embodiments relate to multiple input and multiple output (MIMO) radar systems.

BACKGROUND OF THE INVENTION

Radar provides the ability to detect objects in challenging scenarios (e.g., snow, rain, low or no lighting, etc.). Radar can be used to provide range, speed, and angle data for objects and can have myriad uses including collision avoidance (e.g., for a vehicle) and target detection (e.g., detection of a drone from a ground-based station). Vehicular-based radar systems may have many uses including parking assist, blind spot monitoring, lane change assist, automatic cruise control and automatic emergency braking.

One type of radar system that employs multiple transmitters and receivers, also called a multiple input, multiple output (MIMO) radar configuration, can be used to determine angular information for an object so it can be positioned in space relative to the antennas. With traditional radar systems, the angular resolution of a radar system is directly linked to the quantity of antennas used, in line with the Nyquist-Shannon limitation. Thus, to improve the angular resolution of such radar systems the number of antennas needs to be increased which commensurately increases the system cost, weight, and complexity.

Some MIMO radar systems employ methods to create virtual antenna arrays such that a given MIMO radar system having a fixed number of physical antennas can have improved angular resolution. For example, if a MIMO radar system has 3 "physical" transmit antennas and 4 "physical" receive antennas, a 12-element "virtual" antenna array can be created where the virtual antennas are generated via digital signal processing of the received signals. However, if one or more of the physical antennas do not have consistent $\lambda/2$ spacing between adjacent antennas, the 12-element virtual antenna may have "gaps" (e.g., a spacing larger $\lambda/2$) that result in the array having non-uniform phase which is detrimental to angle processing. New radar systems are needed that can provide uniform phase for physical antenna arrays having one or more spaces between adjacent antennas that are not $\lambda/2$.

SUMMARY OF THE INVENTION

In some embodiments a radar system comprises a physical radar array comprising a plurality of physical transmit antennas, each configured to transmit a respective signal having a wavelength $\lambda$. The physical radar array further comprises a plurality of physical receive antennas, each configured to receive each of the respective signals. The radar system further comprises a neural network configured to receive data from the physical radar array and generate data corresponding to an emulated array of antennas, wherein a defined distance between each antenna of the emulated array of antennas is $\lambda/2$. In various embodiments the neural network operates on a processor that is configured to generate data corresponding to a virtual antenna array having a defined distance between each virtual antenna that is inconsistent, and wherein the neural network uses the generated data corresponding to the virtual antenna array to generate the data corresponding to the emulated array of antennas.

In some embodiments the neural network is trained via machine learning. In various embodiments at least two adjacent antennas of the plurality of physical receive antennas are spaced apart by a distance that is a non-integer, or integer multiple of $\lambda/2$. In some embodiments at least two adjacent antennas of the plurality of physical transmit antennas are spaced apart by a distance greater than $\lambda/2$. In various embodiments at least two adjacent antennas of the plurality of physical transmit antennas are spaced apart by a distance less than $\lambda/2$. In some embodiments at least two adjacent antennas of the plurality of physical receive antennas are spaced apart by a distance greater than $\lambda/2$. In various embodiments at least two adjacent antennas of the plurality of physical receive antennas are spaced apart by a distance less than $\lambda/2$.

In some embodiments a radar system comprises a physical antenna array comprising a plurality of physical transmit antennas, each configured to transmit a respective signal having a wavelength $\lambda$, and a plurality of physical receive antennas, each configured to receive each of the respective signals. The physical antenna array further comprises a processor coupled to the physical antenna array and arranged to generate data for a virtual antenna array using data received from the physical antenna array, and generate, using a neural network, data for an emulated array of antennas wherein a defined distance between each antenna of the emulated array of antennas is $\lambda/2$, and wherein the neural network uses the data for the virtual antenna array. In various embodiments the virtual antenna array has a defined distance between each virtual antenna that is inconsistent. In some embodiments the neural network is trained via machine learning. In various embodiments at least two adjacent antennas of the plurality of physical transmit antennas are spaced apart by a distance greater than $\lambda/2$.

In some embodiments at least two adjacent antennas of the plurality of physical transmit antennas are spaced apart by a distance less than $\lambda/2$. In various embodiments at least two adjacent antennas of the plurality of physical receive antennas are spaced apart by a distance greater than $\lambda/2$. In some embodiments at least two adjacent antennas of the plurality of physical receive antennas are spaced apart by a distance less than $\lambda/2$.

In some embodiments a method of operating a radar system comprises generating data from a physical antenna array, wherein the physical antenna array comprises a a plurality of physical transmit antennas, each configured to transmit a respective signal having a wavelength $\lambda$, and a plurality of physical receive antennas, each configured to receive each of the respective signals. The method further comprises generating, using a neural network, data for an emulated array of antennas wherein a defined distance between each antenna of the emulated array of antennas is $\lambda/2$.

In some embodiments the neural network operates on a processor that is configured to generate data corresponding to a virtual antenna array having a defined distance between each virtual antenna that is inconsistent. In various embodiments the data corresponding to the virtual antenna array is used by the neural network to generate the data corresponding to the emulated array of antennas. In some embodiments the neural network is trained via machine learning. In various embodiments at least two adjacent antennas of the plurality of virtual receive antennas are spaced apart by a distance that is not $\lambda/2$.

DETAILED DESCRIPTION

Figure 1A:
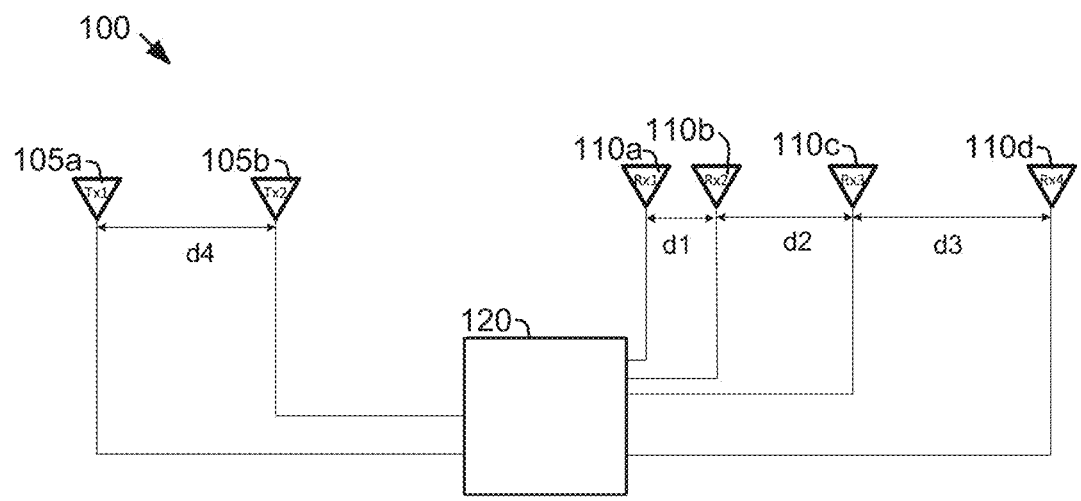
FIG. 1A is a simplified diagram of a radar system with non-standard (sparse, uniform or non-uniform) spacing between physical antenna elements, according to some aspects of the present disclosure.

A multiple input multiple output (MIMO) radar configuration employs multiple physical transmit antennas and receive antennas that are used to generate a virtual antenna array which can be used to calculate angular information for an object. However, if each of the physical antennas does not have "$\lambda/2$-based spacing" between adjacent antennas, the resulting virtual array will have one or more gaps causing non-uniform phase that either prevents angular calculations from being performed or degrades the resolution of the angular calculations. The present invention uses a neural network to supplement the data generated by the physical antennas, providing the virtual array with uniform phase so the angular calculations can be performed with the requisite resolution.

In a first embodiment, the present invention uses data from the physical transmit and receive antennas to generate a virtual antenna array, however because one or more of the physical transmit and/or receive antennas does not have "$\lambda/2$-based spacing" the resulting virtual antenna array has one or more gaps (e.g., one or more spaces between virtual antennas that are integer multiples of $\lambda/2$ where the integer is greater than 1). More specifically, "$\lambda/2$-based spacing" of the physical antennas is when the direct generation of a virtual antenna array from the physical antennas results in consistent $\lambda/2$ spacing between each virtual antenna. This embodiment employs a neural network to generate data for one or more supplemental antennas that are used to "fill in" the one or more gaps so the resulting supplemented virtual antenna array has a consistent $\lambda/2$ spacing, and uniform phase. The system uses data from both the virtual antenna array and from the neural network (e.g., the one or more supplemental antennas) to calculate angular information for the radar system.

In a second embodiment, the present invention similarly uses data from the physical transmit and receive antennas to generate data for a virtual array that includes one or more gaps (e.g., one or more missing virtual antennas). However, in this embodiment the one or more gaps in between the physical transmit and/or receive antennas may or may not be an integer multiple of $\lambda/2$, therefore this embodiment can be used for one or more physical antennas that have wavelength independent (e.g., any) spacing. Similar to the embodiment above, the system provides the data from the virtual array to a neural network. A further distinction from the embodiment above is that in this embodiment instead of the neural network only generating data for the missing "supplemented" antennas this neural network generates data for every antenna of an emulated array that has a plurality of virtual antennas all with uniform $\lambda/2$ spacing. The system uses the data from the neural network to calculate angular information for the radar system.

The neural network can be trained via machine learning with data from the physical and/or virtual antennas to fill in the gaps that cause phase discontinuity, providing an antenna array with improved and/or uniform angular resolution. Thus, conventional radar systems can have improved angular resolution and/or improved uniformity of angular resolution with minimal increased system cost, weight, or complexity. These and other embodiments will be described in more detail below.

Neural Network Enhanced Antenna Array

FIG. 1A illustrates a simplified diagram of a radar system 100 with non-"$\lambda/2$-based spacing" (sparse or unequal) spacing between one or more physical antenna elements. As shown in FIG. 1A, in this embodiment there are two physical transmit antennas Tx1 105a and Tx2 105b that each transmit signals at a wavelength λ and that are separated by d4. There are also four physical receive antennas where Rx1 110a is separated from Rx2 110b by d1, Rx3 110c separated from Rx2 by d2 and Rx4 110d is separated from Rx3 by d3. Distributed antenna arrays having non-"λ/2-based spacing" (e.g., sparsity, irregular or inconsistent spacing) can be used on the physical transmitter antennas 105, the physical receiver antennas 110 or both.

More specifically, in a traditional radar system that has "λ/2-based spacing" for example, d1=λ/2, d2=λ/2, d3=λ/2 and d4=2λ such that each virtual antenna of the resulting virtual antenna array is spaced apart at consistent λ/2 intervals. In contrast, in one example embodiment in which the physical receiver antennas 105 have non-"λ/2-based spacing", d1=λ/2, d2=λ, d3=λ/2 and d4=2λ while in other example embodiment the physical transmitter antennas 105 may have non-"λ/2-based spacing", for example, d4=4λ when d1 through d3=λ/2. In this embodiment the non-"λ/2-based spacing" of the physical transmit 105 and/or receive 110 antennas results in a virtual antenna array having one or more "gaps" (a space between adjacent virtual antennas that is an integer multiple of λ/2 where the integer is greater than 1). In some embodiments one or more of d1-d4 is an integer multiple of λ/2 including the integers 2, 3, 4, 5, etc. and may exclude the integer 1.

Each physical transmit and receive antenna, 105, 110, respectively, is connected to a processor 120 that controls each antenna and may more specifically control the transmission operations of the transmit antennas and the received data from the receive antennas. Processor 120 may be any suitable processing system including but not limited to a radio frequency (RF) system-on-chip (SOC), a local and/or remote computing system or a combination of computing systems. Although radar system 100 depicts six physical antennas with a particular spacing (e.g., d1-d4) between each antenna, one of skill in the art having the benefit of this disclosure will appreciate that this invention is not limited to this embodiment and that any suitable number of physical transmit and receive antennas can be used and the spacing therebetween may be any suitable distance.

Figure 1B:
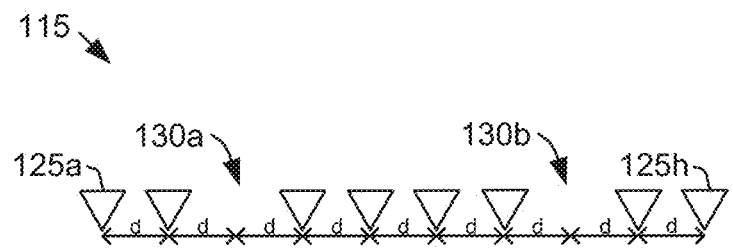
FIG. 1B is an illustration of an example array of "virtual" antennas that can be created via physical antennas and a processor according to some aspects of the present disclosure.

FIG. 1B illustrates an example virtual antenna array 115 that can be created from a combination of the physical transmit antennas 105 and the physical receive antennas 110 via digital signal processing performed by the processor 120 shown in FIG. 1A in its general form. When multiple physical transmit and receive antennas are co-located, they can act together to form what is commonly known as a virtual antenna array 115. The virtual antenna array 115 is not a set of physical antennas, rather it is a mathematically equivalent construct that describes the behavior of the antenna array. The number of virtual elements in a traditional planar virtual antenna array having "N" physical transmit antennas and "M" physical receive antennas is the product of N and M, however if any of the physical antennas have non-"λ/2-based spacing" the number of antenna positions (all having λ/2-based spacing) in the virtual array may be greater than the product of N and M, as described in more detail below As shown in FIG. 1B radar system 100 may employ digital signal processing to create the virtual antenna array 115 of eight virtual receive antennas (125a-125h) from the signals sent to and/or received from the two physical transmit antennas Tx1 105a, Tx2 105b and the four physical receive antennas Rx1 110a, Rx2 110b, Rx3 110c, Rx4 110d. As further shown in FIG. 1B, one or more missing virtual antennas 130a, 130b may form "gaps" (spaces between adjacent virtual antennas that are greater than λ/2, in this case λ) in the virtual antenna array 115 and thus the virtual antenna array may not have uniform phase consistency. The combination of the virtual antennas 125a-125h and the missing virtual antennas 130a-130b each have a consistent defined distance "d" between them where d=λ/2. The virtual antenna array 115 has e.g., sparsity, irregular or inconsistent spacing between virtual antennas 125a because of the missing virtual antennas 130 (e.g., antennas that are missing at λ/2 spacing). For example, the space between virtual antenna 125a and 125b is d (λ/2) whereas the space between virtual antenna 125b and 125c is 2d (λ). In some embodiments the one or more missing virtual antennas 130 may be generated when one or more of the physical transmit and/or receive antennas have non-"λ/2-based spacing".

Figure 1C:
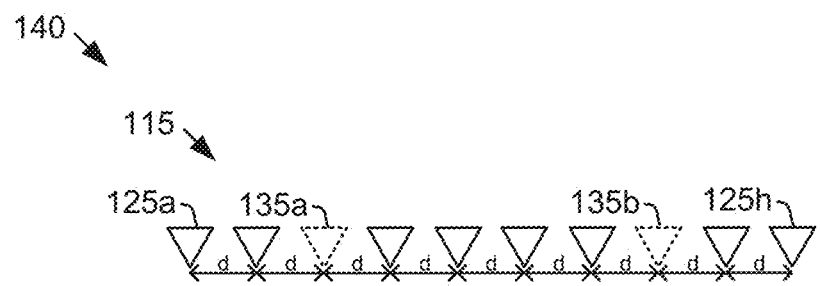
FIG. 1C is an illustration of an example array of "virtual" antennas with gaps filled in with virtual antenna elements, according to some aspects of the present disclosure.

FIG. 1C illustrates the example virtual antenna array 115 shown in FIG. 1B, with missing virtual antennas 130a-130b filled in with supplemental virtual antennas 135a-135b forming a supplemented virtual antenna array 140. The supplemented virtual antenna array 140 includes ten virtual antenna elements regularly spaced at a distance d (where d=λ/2), providing a virtual array of antennas with uniform angular resolution and phase consistency. More specifically, processor 120 (see FIG. 1A) may employ a neural network, machine learning process or other suitable algorithm to generate data for each supplemental virtual antenna 135 such that processor 120 can detect objects uniformly across all 10 antenna elements. Processor 120 may use data from the physical transmit antennas 105 (see FIG. 1A) and the physical receive antennas 110 to generate data for the supplemental virtual antennas 135. As shown in FIG. 1C, the number of virtual antennas for the supplemented virtual array 140 is the product of M and N (two times four) plus the number of supplemental virtual antennas (in this case there are two) so in this example there are ten virtual antennas. As appreciated by a person of ordinary skill in the art having the benefit of this disclosure processor 120 may include one or more processors that work in conjunction with each other. In one example embodiment a first processor is an RF ASIC that communicates with the physical antennas, a second process is used for data transfer and a third processor is used for the neural network processing.

The neural network can be trained based on a machine learning model, including Deep Neural Networks (DNN), convolutional neural network (CNN) or any other suitable type of training, some of which can be based on a neural network. In some embodiments the neural network may undergo training to understand patterns and correlations within the available radar data, enabling the network to estimate the signals for the supplemental virtual antennas 135 that are missing in the virtual array and send corresponding data to processor 120. In some embodiments the neural network can produce data for supplemental antennas 135 while in further embodiments the neural network can additionally produce data for each virtual antenna 125 so the processor produces data for each antenna of the supplemented virtual antenna array 140. In various embodiments the neural network may be integrated into processor 120 and/or may form a portion of a system-on-a-chip. In some embodiments d, which is a spacing between each element of the supplemented virtual array 115, is λ/2.

As appreciated by one of ordinary skill in the art having the benefit of this disclosure, in some embodiments, when the field of view of the system is greater than or less than 180 degrees, the optimal spacing between each antenna of the supplemented virtual array 140 may be greater than or less than λ/2 and may be referred to more generally as a "predetermined distance". For example, in one embodiment a desired field of view of the supplemented virtual array 140 is 120 degrees and therefore the optimal predetermined distance between each antenna of the supplemented virtual antenna array is $\lambda/3$. In various embodiments the predetermined distance may be $\lambda/2$ while in other embodiments the predetermined distance may be greater or less than $\lambda/2$.

In some embodiments transmit antennas 105 may be arranged in a two-dimensional array providing the radar system 100 with a two-dimensional virtual antenna that provides data for both azimuth and elevation dimensions. For example, radar system 100 may use a transmit antenna array similar to transmit antenna 1105 shown in FIG. 11 and described in greater detail below.

Figure 2:
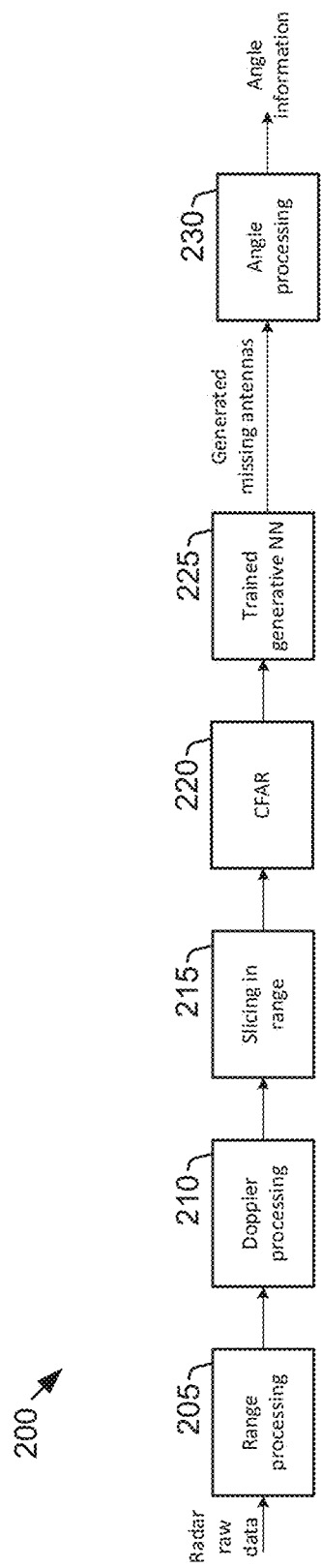
FIG. 2 is an example block diagram of how a radar system may work, according to embodiments of the present disclosure.

FIG. 2 is an example block diagram of how radar system 100 shown in FIG. 1A may work, according to embodiments of the disclosure. As shown in FIG. 2, raw data from the radar array (e.g., from processor 120, receive antennas 110 and/or transmit antennas 105) enters range processing 205 where ranges of the targets are processed. Data is transferred from range processing to a doppler processing 210 before slicing 215 takes place. The sliced data is transferred to a Constant False Alarm Rate (CFAR) processing 220 which may be used to detect target returns against a background of noise, clutter, and interference. The results of the CFAR analysis may then be used to generate supplemental virtual antenna elements 135 (see FIG. 1C) via a trained generative neural network 225. Data from the supplemental virtual antenna elements 135 (see FIG. 1C), from the virtual antenna elements 125 (see FIG. 1C) and optionally from the physical antenna elements 105, 110 (see FIG. 1A) is transferred to angle processing 230, from which angle information is derived.

Figure 3:
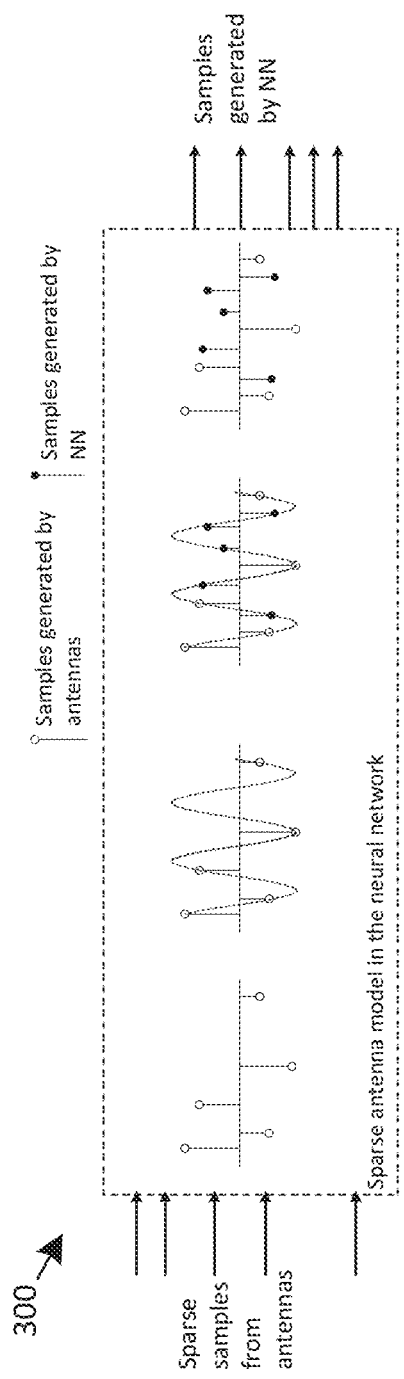
FIG. 3 is an illustration of a simplified model of one embodiment of a generation of antennas inside a neural network model, according to some aspects of the present disclosure.

FIG. 3 illustrates a simplified model 300 of one embodiment of the generation of a supplemental virtual antennas using a neural network model. This generator network may be responsible for generating data for the missing virtual antennas (e.g., supplemental virtual antennas). The training process allows the generator to improve over time and produce more realistic samples. As shown in FIG. 3 the sparse input signal may be part of a sampled continuous signal. Note that the samples are defined in a space dimension, which are the data received from antennas. The generated samples by the neural network correspond to the signals of the missing antennas in angle domain of the radar. These signals can be alternatively used along with the signals from original receivers for angle processing. Angle processing data may be used to generate angle information for the object(s).

The integration of a neural network with sparse antennas may be used to transform the radar system from a discrete-time low-resolution signal to a high-resolution signal within the network architecture. In some embodiments the network may be based on a Tensorflow Processing Units (TPU) or other suitable approach that utilizes distributed antennas in conjunction with the neural network.

Figure 4:
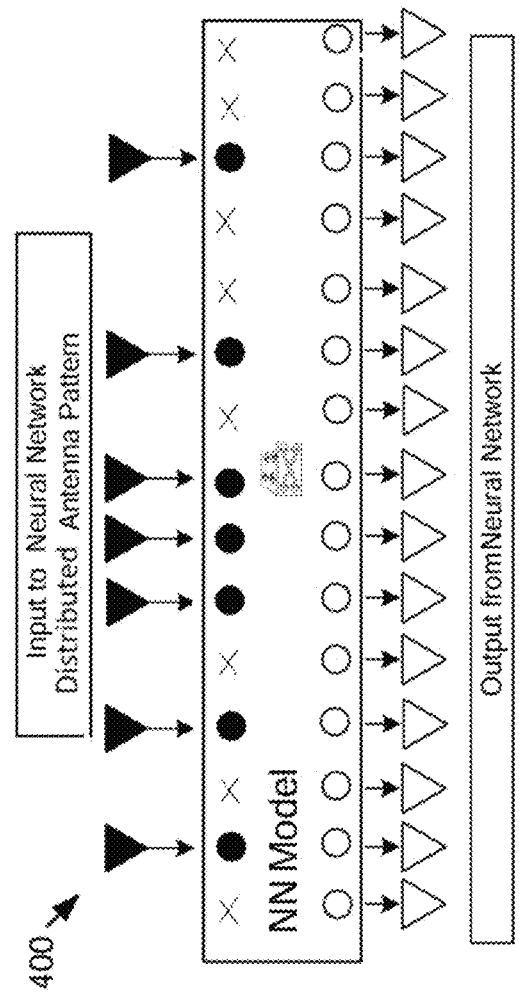
FIG. 4 is an illustration of a high-level depiction of a machine learning-based neural network model, according to embodiments of the present disclosure.

FIG. 4 illustrates a high-level depiction of a machine learning-based neural network model 400, according to embodiments of the invention. As shown in FIG. 4, the neural network can be used to generate the data for supplemental antennas using the trained model and may be based on the locations of the antennas. In some embodiments the system may generate supplemental antenna elements.

Figure 5:
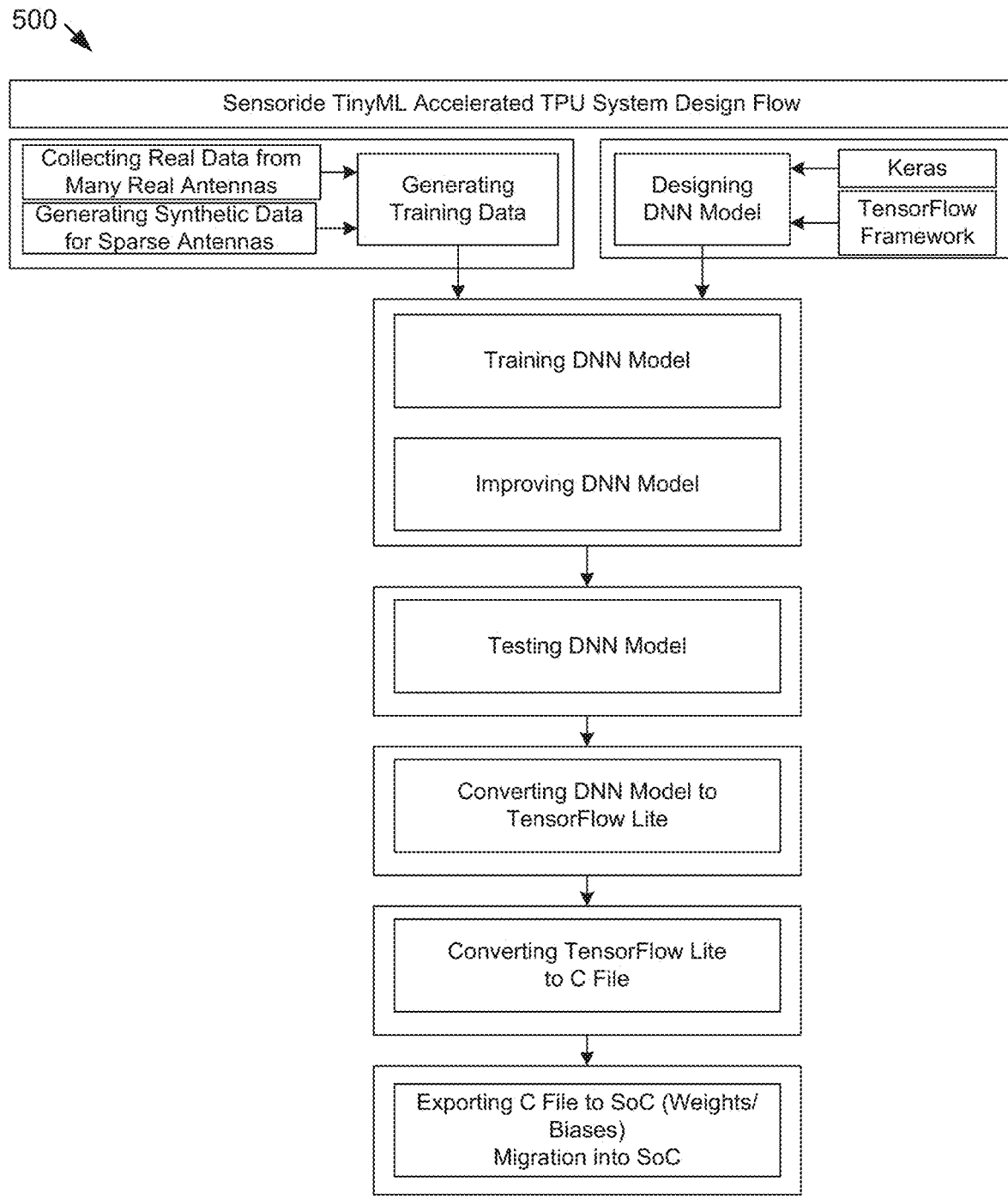
FIG. 5 is an illustration of example steps associated with training a machine learning model, according to embodiments of the present disclosure.

FIG. 5 illustrates example steps associated with a method of training a machine learning model 500, according to embodiments of the disclosure. As shown in FIG. 5, the training may apply in the angle domain if the focus is on improved angular resolution, however, other embodiments may employ different suitable training algorithms. In some embodiments, the deep learning network, or any other suitable neural network model, is capable of learning and capturing patterns within the underlying data. In one example a dataset comprising 10,000 instances is generated, e.g., test scenarios, that represent typical test scenarios. This dataset may consist of both real and imaginary data, enabling the deep learning network to learn and model the patterns effectively.

Datasets may be divided into three subsets: training, validation, and test. The division may be used to assess the accuracy of the trained model by comparing its predictions to actual data and determining the level of agreement between them. In order to have data available for evaluation, a portion of the dataset may be set aside before the training process begins. In one example 20% of the data is reserved for validation, 20% is used for testing, and the remainder of 60% is used to train the model.

A person of skill in the art, with the benefit of this disclosure, will appreciate that, in other embodiments, the machine learning model 500 may have variations, modifications and alternatives that are within the scope of this disclosure. For example, the machine learning model 500 describes several functions including DNN, TinyML Keras, Tensorflow, however this disclosure is not limited these disclosed functions and other suitable functions can be used in addition to or in place of the disclosed function. In one example, a CNN model may be used in place of the DNN model. Further, the order of the steps disclosed in the machine learning model 500 may be changed.

Figure 6:
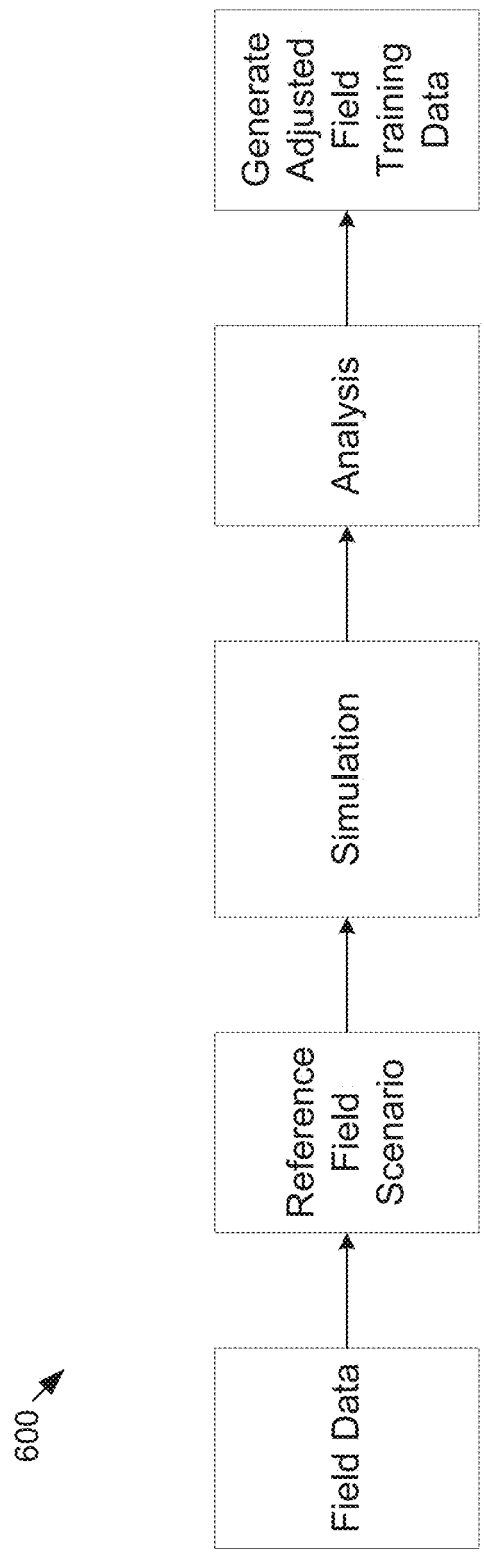
FIG. 6 is a flow chart for a simplified example process for generating training data for a machine learning model, according to embodiments of the present disclosure.

FIG. 6 illustrates on example of a simplified process 600 for generating training data for the machine learning model, according to embodiments of the disclosure. Other suitable training processes may be used. As shown in FIG. 6, real-world field data may be used to train the model. The data used for training the neural networks may include three types of radar input, which are outlined below:

Theoretical data: Preliminary radar data, typically system generated and used in simulations for algorithm development.

Real-world field data: Radar data gathered from selected scenarios (e.g., a pedestrian).

Hybrid data: Creating numerous synthetic scenarios using a subset of real-world measurements that effectively replicate hundreds of challenging scenarios of interest.

A training data set may be created from the real-world field data as the baseline and then adjustments can be made to the phase, amplitude, and duplications, including normalization. The model's ability to effectively learn from the data and achieve accurate detection performance in radar applications is evaluated during the training. This evaluation may be carried out by calculating, for example, both a loss metric and an error metric:

Loss Metric: This is the output of the loss function which may be mean squared error, which is expressed as a positive number. Generally, the smaller the loss value, the better.

Mean Absolute Error (MAE) Metric: This is the mean absolute error of the training data. It shows the average difference between the network's output regression and the expected values from the training data.

The trained model may utilize signals from the physical sparse antennas as input and generate a set of additional and new virtual antennas as output. This specific problem falls under the category of regression, where the model aims to predict continuous phase values based on the given input. To develop the model, any suitable neural network architecture may be used that consists of layers of interconnected neurons that aim to learn patterns and relationships within the training radar data to make accurate estimations.

Figure 7:
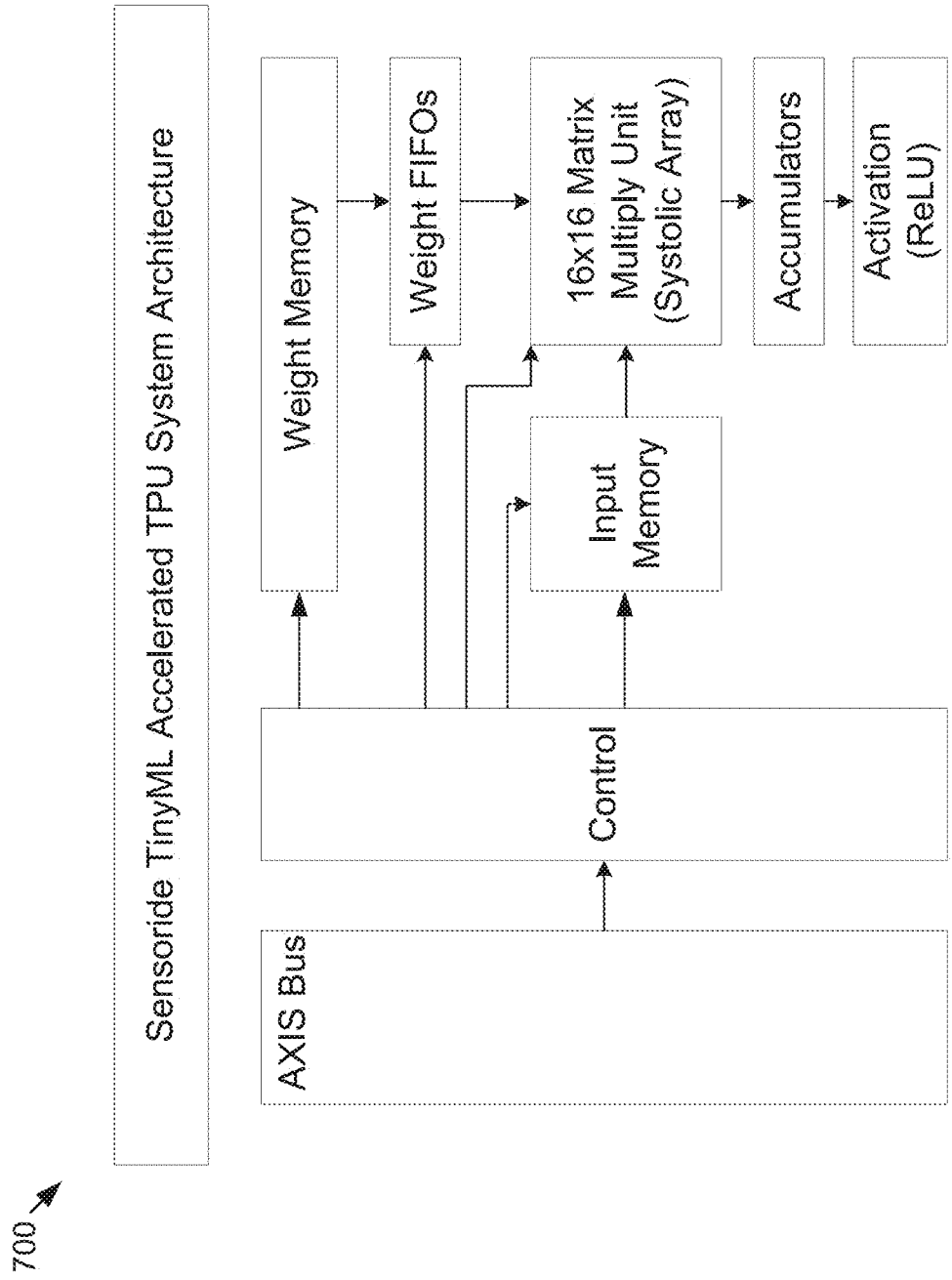
FIG. 7 is an illustration of an architecture for integrating a generated model into a hardware-accelerated architecture based on a Field Programmable Gate Array (FPGA) according to some aspects of the present disclosure.

FIG. 7 illustrates an architecture 700 of integrating the generated model into a hardware-accelerated architecture based on a FPGA. As shown in FIG. 7, the commands and data are transferred through the PS interface using the AXIS bus. Upon reception, these commands are decoded and directed to one of the following functions:

Write Weight Memory: Data on the bus is written into a specific location in Weight Memory space.

Write Input Memory: Data on the bus is written onto a specified location in Input Memory space.

Fill Weight FIFO's: A set of weights is read from weight memory into the weight FIFO's.

Drain Weight FIFO's: A set of weights currently held in the weight FIFOs is loaded into the systolic array.

Matrix Multiply: A set of inputs is piped into the systolic array and multiplied with the set of weights currently held in the array.

Read Output Memory: A specified word from memory is read to the host.

The architecture may utilize a weight stationary systolic array, which operates by loading a set of weights once and reusing them for multiple operations. This array may be fully pipelined and can perform a 16×16 matrix multiplication in 32 cycles. The systolic array consists of multiple processing elements (PEs) that contain a small amount of memory and control logic, along with a single multiply-accumulate data path. The execution of a complete matrix multiplication starts from the top left corner of the systolic array and progresses diagonally downward in a pipelined fashion.

Figure 8:
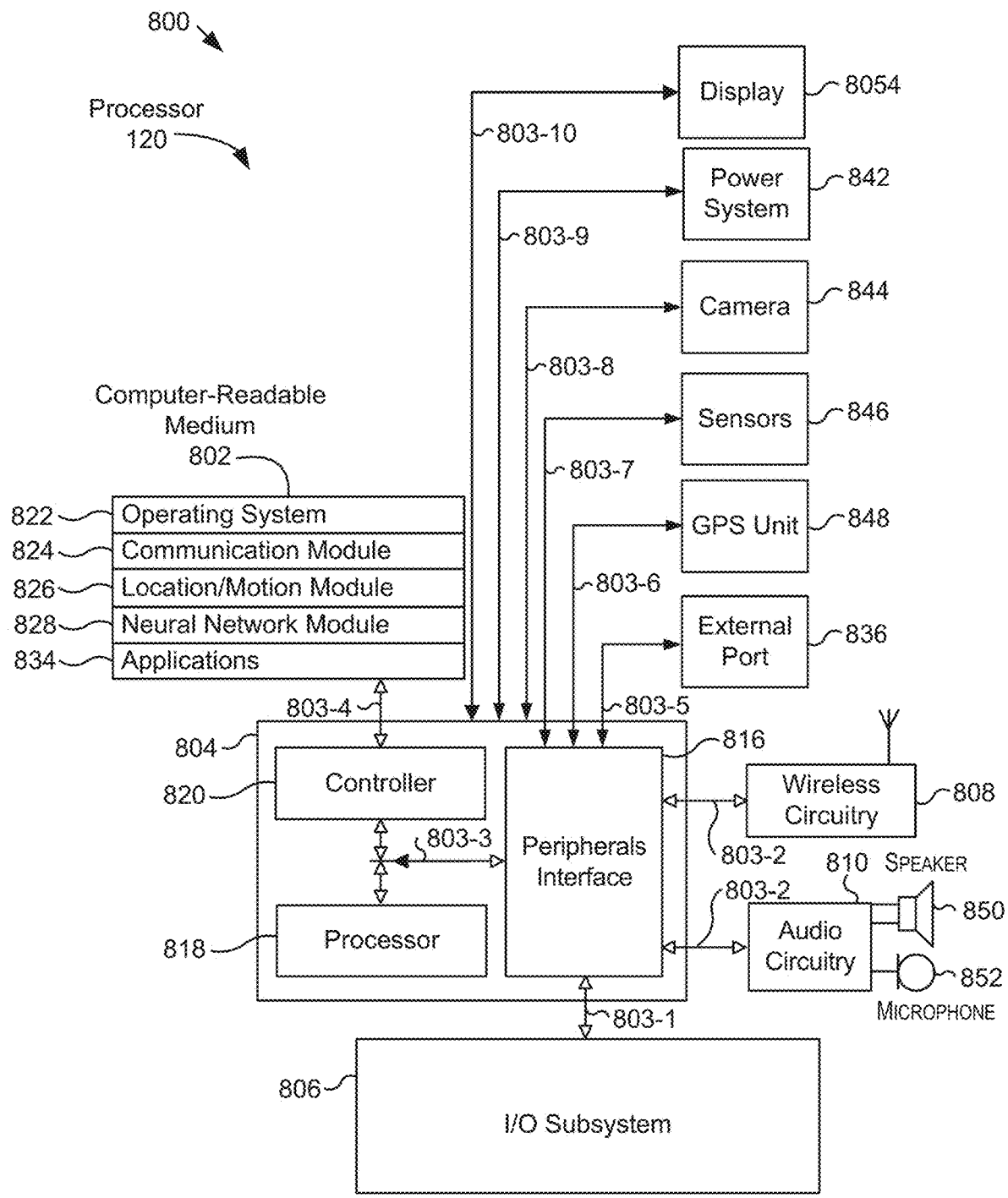
FIG. 8 is a block diagram of an example processor that may be used to operate a radar system having an array of physical antennas to generate an array of virtual antennas with generated antennas to fill gaps within the array of virtual antennas, according to embodiments of the present disclosure.

FIG. 8 is a block diagram 800 of an example processor 120 (see FIG. 1A) that may be used to operate a radar system having an array of physical antennas to generate an array of virtual antennas with continuous phase, according to embodiments of the disclosure. Processor 120 may be one or more semiconductor devices including but not limited to a system on a chip (SOC), a multi-chip module, a field programmable gate array (FPGA) or other suitable device. In some embodiments, processor 120 may include a computer-readable medium (memory) 802, a processing system 804, an Input/Output (I/O) subsystem 806, wireless circuitry 808, and audio circuitry 810 including speaker 850 and microphone 852. These components may be coupled by one or more communication buses or signal lines 803. Processor 120 can encompass any suitable processing device and/or portable electronic device, including a handheld computer, a tablet computer, a remote control unit for a drone, a mobile phone, laptop computer, tablet device, media player, a wearable device, personal digital assistant (PDA), a multi-function device, a mobile phone, a portable gaming device, a car display unit, or the like, including a combination of two or more of these items.

The processor 120 can be a system on chip (SOC) which may be an RF device with an embedded processor or can be any other suitable processor in accordance with some embodiments. The touch screen optionally displays one or more graphics within user interface (UI). In some embodiments, a user is enabled to select one or more of the graphics by making a gesture on the graphics, for example, with one or more fingers or one or more styluses. In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with processor 120. In some implementations or circumstances, inadvertent contact with a graphic does not select the graphic. For example, a swipe gesture that sweeps over an application icon optionally does not select the corresponding application when the gesture corresponding to selection is a tap. Processor 120 can optionally also include one or more physical buttons, such as "home" or menu button. As menu button is, optionally, used to navigate to any application in a set of applications that are, optionally, executed on the processor 120. Alternatively, in some embodiments, the menu button is implemented as a soft key in a graphical user interface displayed on touch screen.

The processor 120 can incorporate a display 854. The display 854 can be a LCD, OLED, AMOLED, Super AMOLED, TFT, IPS, or TFT-LCD that typically can be found a computing device. The display 854 may be a touch screen display of a computing device.

In one embodiment, processor 120 includes touch screen, menu button, push button for powering the device on/off and locking the device, volume adjustment button(s), Subscriber Identity Module (SIM) card slot, head set jack, and docking/charging external port. Push button is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, processor 120 also accepts verbal input for activation or deactivation of some functions through microphone. Processor 120 also, optionally, includes one or more contact intensity sensors for detecting intensity of contacts on touch screen and/or one or more tactile output generators for generating tactile outputs for a user of processor 120.

In one illustrative configuration, processor 120 may include at least one computer-readable medium (memory) 802 and one or more processing units (or processor(s)) 818. Processor(s) 818 may be implemented as appropriate in hardware, software, or combinations thereof. Computer-executable instruction or firmware implementations of processor(s) 818 may include computer-executable instructions written in any suitable programming language to perform the various functions described.

Computer-readable medium (memory) 802 may store program instructions that are loadable and executable on processor(s) 818, as well as data generated during the execution of these programs. Depending on the configuration and type of processor 120, memory 802 may be volatile (such as random access memory (RAM)) and/or non-volatile (such as read-only memory (ROM), flash memory, etc.). Processor 120 can have one or more memories. Processor 120 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the devices. In some implementations, memory 802 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

Memory 802 and additional storage, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. Memory 802 and additional storage are both examples of non-transitory computer storage media. Additional types of computer storage media that may be present in processor 120 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by processor 120. Combinations of any of the above should also be included within the scope of non-transitory computer-readable storage media. Based on the disclosure and teachings provided herein, a person of ordinary skill in the art can appreciate other ways and/or methods to implement the various embodiments. However, as noted above, computer-readable storage media does not include transitory media such as carrier waves or the like.

Alternatively, computer-readable communication media may include computer-readable instructions, program modules, or other data transmitted within a data signal, such as a carrier wave, or other transmission. However, as used herein, computer-readable storage media does not include computer-readable communication media.

Processor 120 may also contain communications connection(s) 808 that allow processor 120 to communicate with a data store, another device or server, user terminals and/or other devices via one or more networks. Such networks may include any one or a combination of many different types of networks, such as cable networks, the Internet, wireless networks, cellular networks, satellite networks, other private and/or public networks, or any combination thereof. Processor 120 may also include I/O device(s) 806, such as a touch input device, a keyboard, a mouse, a pen, a voice input device, a display, a speaker, a printer, etc.

It should be apparent that the architecture shown in FIG. 8 is only one example of an architecture for processor 120, and that processor 120 can have more or fewer components than shown, or a different configuration of components. The various components shown in FIG. 8 can be implemented in hardware, software, or a combination of both hardware and software, including one or more signal processing and/or application specific integrated circuits.

Wireless circuitry 808 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 808 can use various protocols, e.g., as described herein. For example, wireless circuitry 808 can have one component for one wireless protocol (e.g., Bluetooth®) and a separate component for another wireless protocol (e.g., UWB). Different antennas can be used for the different protocols.

Wireless circuitry 808 is coupled to processing system 804 via peripherals interface 816. Interface 816 can include conventional components for establishing and maintaining communication between peripherals and processing system 804. Voice and data information received by wireless circuitry 808 (e.g., in speech recognition or voice command applications) is sent to one or more processors 818 via peripherals interface 816. One or more processors 818 are configurable to process various data formats for one or more application programs 834 stored on computer-readable medium (memory) 802.

Peripherals interface 816 couple the input and output peripherals of the device to processor(s) 818 and computer-readable medium 802. One or more processors 818 communicate with computer-readable medium 802 via a controller 820. Computer-readable medium 802 can be any device or medium that can store code and/or data for use by one or more processors 818. Medium 802 can include a memory hierarchy, including cache, main memory, and secondary memory.

Processor 120 also includes a power system 842 for powering the various hardware components. Power system 842 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management, and distribution of power in mobile devices.

In some embodiments, processor 120 includes a camera 844. In some embodiments, processor 120 includes sensors 846. Sensors 846 can include accelerometers, compasses, gyrometers, pressure sensors, audio sensors, light sensors, barometers, and the like. Sensors 846 can be used to sense location aspects, such as auditory or light signatures of a location.

In some embodiments, processor 120 can include a GPS receiver, sometimes referred to as a GPS unit 848. A mobile device can use a satellite navigation system, such as the Global Positioning System (GPS), to obtain position information, timing information, altitude, or other navigation information, including for one or more objects detected by the radar system. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 818 run various software components stored in medium 802 to perform various functions for processor 120. In some embodiments, the software components include an operating system 822, a communication module (or set of instructions) 824, a location module (or set of instructions) 826, a bounding path 828 that is used as part of ranging operation described herein, and other applications (or set of instructions) 834.

Operating system 822 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components. An operating system 822 is system software that manages computer hardware and software resources and provides common services for computer programs. For example, the operating system 822 can manage the interaction between the user interface module and one or more user application(s). The various embodiments further can be implemented in a wide variety of operating environments, which in some cases can include one or more user computers, devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Communication module 824 facilitates communication with other devices over one or more external ports 836 or via wireless circuitry 808 and includes various software components for handling data received from wireless circuitry 808 and/or external port 836. External port 836 (e.g., USB, FireWire, Lightning connector, 60-pin connector, etc.) is adapted for coupling directly to other devices or indirectly over a network (e.g., the Internet, wireless LAN, etc.).

Location/motion module 826 can assist in determining the current position (e.g., coordinates or other geographic location identifiers) and motion of processor 120 and/or one or more object detected by the radar system. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 826 receives data from GPS unit 848 and analyzes the signals to determine the current position of the mobile device. In some embodiments, location/motion module 826 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 808 and is passed to location/motion module 826. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for processor 120 based on the position coordinates of the corresponding transmitters. Regardless of the specific location technology used, location/motion module 826 receives information from which a location fix can be derived, interprets that information, and returns location information, such as geographic coordinates, latitude/longitude, or other location fix data.

The neural network module 828 can be employed with sparse antennas and used to generate a new radar data with continuous phase from a discrete-time physically sparse signal configuration within the network architecture. In some embodiments the network may be based on a Tensorflow Processing Units (TPU) approach that utilizes sparse antennas in conjunction with the neural network. The neural network can be trained based on machine learning model based on perception, including Deep Neural Networks (DNN) and convolutional neural network (CNN). In some embodiments the neural network may undergo training to understand patterns and correlations within the available radar data, enabling the network to estimate the signals for the generated virtual antennas.

The one or more applications programs 834 on the mobile device can include any applications installed on the processor 120, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating, and displaying graphical objects (including without limitation text, web pages, icons, digital images, animations and the like) on a display surface. In another example, a timer module can be a software timer. The timer module can also be implemented in hardware. The timer module can maintain various timers for any number of events.

The I/O subsystem 806 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 806 can include a display and user input devices such as a keyboard, mouse, and/or track pad. In some embodiments, I/O subsystem 806 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, processor 120 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art can appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically can include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other devices such as network input/output devices may be employed.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid state drive, a hard drive, a CD, or an entire computer system), and may be present on or within different computer products within a system or network. A computer system may include a monitor, printer, or other suitable display for providing any of the results mentioned herein to a user.

Antenna Array with Wavelength Independent Spacing

Figure 9:
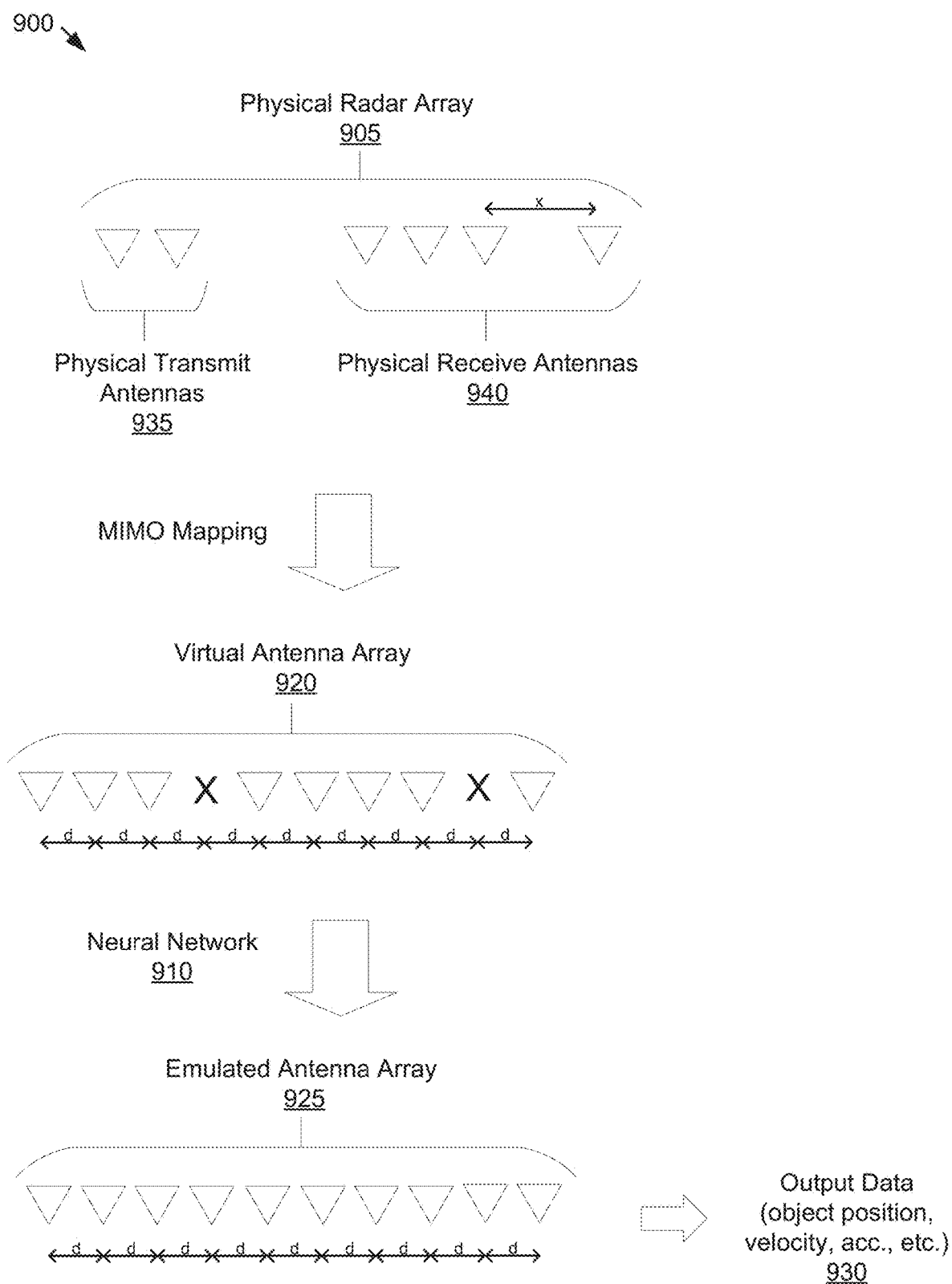
FIG. 9 is a simplified diagram of a radar system that determines target information using a physical receive antenna array having at least one physical antenna (e.g., can be either transmitter or receiver) with wavelength independent spacing, according to embodiments of the disclosure.

FIG. 9 illustrates a simplified diagram of a radar system 900 that determines information for objects using a physical receive antenna array having at least one antenna with wavelength independent spacing, according to embodiments of the disclosure. Radar system 900 is similar to radar system 100 and generates data for a virtual array that includes one or more gaps (e.g., one or more missing virtual antennas due to the wavelength independent spacing of the physical receive antennas). However, in radar system 900, instead of the neural network generating data for the missing virtual antennas, radar system 900 generates data for each antenna of an emulated antenna array where each antenna has uniform $\lambda/2$ spacing. The system uses data for the emulated antenna to calculate angular information for the radar system.

More specifically, in radar system 100 described above, the virtual antenna array 115 may have one or more gaps that integer multiples of $\lambda/2$ where the integer is greater than one, and wherein the one or more gaps are filled in with supplemental antenna elements generated by a neural network to provide the system with data from a supplemented array of virtual antenna elements having a consistent $\lambda/2$ spacing. In contrast, in some of the embodiments described below, one or more of the physical antennas may be spaced apart from an adjacent antenna by any distance which may be unrelated to the wavelength A of the transmit antennas (e.g., wavelength independent). For example, one or more of the physical antennas may be spaced apart from an adjacent physical antenna by, for example, $1.3\lambda/2$, $0.8\lambda/2$, $\lambda$, $0.6\lambda$, $2\lambda$, 10 millimeters etc., including non-integer values of $\lambda/2$. A neural network converts data from the physical antennas to data for an emulated antenna array having a consistent $\lambda/2$ spacing which is used for the angular calculations. The array of regularly spaced antennas provides a continuous signal phase across the emulated array and enables the field of view (FOV) to remain at ±90°.

In some embodiments the spacing between each physical receive antenna 940 of the radar is greater than $\lambda/2$ (e.g., $1.2\lambda/2$) and the radar system has an unaffected FOV (e.g., ±90°) and improved angular resolution as compared to a radar system that has consistent $\lambda/2$ spacing. In another embodiment the spacing between each physical receive antenna 940 is less than $\lambda/2$ (e.g., $0.6\lambda/2$) and the radar system has an unaffected FOV and reduced resolution as compared to a radar array that has consistent $\lambda/2$ spacing, which is in contrast to a traditional radar system (e.g., no neural network) which would not be efficiently operational with antennas at a spacing of less than $\lambda/2$. Thus, the present disclosure enables radar systems having receive antennas at wavelength independent spacing.

As described herein, wavelength independent spacing is when one or more of the distances between adjacent physical receive and/or transmit antennas is not $\lambda/2$-based, which is the traditional "wavelength dependent" spacing between physical antennas. More specifically, the radar systems disclosed herein can use any suitable spacing between physical antenna elements and therefore can be considered "wavelength independent" spacing as defined herein. Further, even though some distances between adjacent antennas are described herein using the term $\lambda$, $$\left(\text{e.g., } \frac{1.3\lambda}{2}\right)$$

the use of $\lambda$ does not mean the distance between the antennas is "wavelength dependent", in particular, when used with a non-integer value of $\lambda$ or when any spacing between physical antennas is not $\lambda/2$-based spacing. Rather, the use of $\lambda$ in such ways herein is merely one way to describe the spacing between antennas as related to a transmission wavelength of the physical transmit antennas.

In some embodiments radar system 900 may use wavelength independent spacing of antenna elements to improve the angular resolution of a radar system without sacrificing the FOV while in further embodiments the angular resolution and FOV may be able to be tuned to specific use cases that e.g., need a narrower field of view and increased angular resolution in only a portion of the field, etc. In some embodiments this methodology can eliminate a dependency between angular resolution and unambiguous field of view constraints, which in conventional systems are both dependent on antenna spacings. The angular resolution enhancement can be a software dependent enhancement and can be carried out under spacing that is uniform, semi-uniform or nonlinear/nonuniform. The methodology can apply to MIMO or any other suitable type of radar systems. In further embodiments the transmit antennas can also, or alternatively, have elevation and/or azimuth wavelength independent spacings and the machine learning model can be trained to generate data from an emulated array of receive antennas having consistent and uniform $\lambda/2$ spacing in the elevation and azimuth dimensions. These and other features of radar systems having wavelength-independent antenna spacings will be described in more detail below.

As shown in FIG. 9, radar system 900 includes a physical radar array 905 that may generate data that a processor may use to generate an optional virtual antenna array 920. A neural network 910 may use data from the virtual antenna array 920 and/or the physical radar array 905 to generate data for an emulated antenna array 925 having an array of virtual receive antennas 920 (e.g., virtual receivers) uniformly spaced at a distance of $\lambda/2$. The radar system 900 may be or include any of the components, features, or characteristics of any of the radar systems previously described in the present disclosure.

The physical radar system 905 can include a plurality of physical transmit antennas 935. Each of the physical transmit antennas 935 can transmit a respective signal having a wavelength of $\lambda$. The physical transmit antennas 935 can be spaced apart from each other forming a 1-dimensional, 2-dimensional or other suitable geometry array, as described in more detail below (see e.g., FIG. 11). The physical radar system 905 can further include a plurality of physical receive antennas 940. The number of physical receive antennas 940 in the physical radar system 905 may be the same as or may differ from the number of physical transmit antennas 935. While two physical transmit antennas 935 and four physical receive antennas 940 are depicted in FIG. 9, the physical radar system 905 can include any suitable number of physical transmit antennas and receive antennas. Each physical receive antenna 940 can receive each of the respective signals transmitted from each of the physical transmit antennas 935. The physical receive antennas 940 can be spaced apart from each adjacent physical receive antenna by a predetermined spacing, one of which may not be λ/2 (e.g., wavelength independent). This results the spacing between virtual antenna elements to not uniformly be λ/2-based spacing. More specifically, in some embodiments the spacing between two adjacent virtual receive antennas may be for example $$\frac{1.3\lambda}{2}, \frac{0.8\lambda}{2},$$

λ, 0.6λ, 2λ, 5 millimeters etc., including non-integer values (e.g., a wavelength independent value). The spacing between one or more physical transmit antennas 935 may also or may alternatively not be λ/2 (e.g., may be wavelength independent). In some embodiments, at least two physical receive antennas 940 and/or at least two physical transmit antennas 935 can be spaced apart by a distance that can be a wavelength independent value.

Optionally, radar system 900 may employ a processor (e.g., processor 110 in FIG. 1A) to generate a virtual antenna array 920 that can be created from a combination of the physical transmit antennas 935 and the physical receive antennas 940. When multiple transmit and receive antennas are co-located, they can act together to form what is commonly known as a virtual antenna array. The virtual antenna array 920 is not a set of physical antennas, rather it is a mathematically equivalent construct that describes the behavior of the antenna array.

The radar system 900 may employ digital signal processing to create the virtual antenna array 920 of virtual receive antennas from parameters of the physical transmit antennas 935 and the physical receive antennas 940. The parameters can include which transmit antenna is transmitting, a timing and/or phase of such transmission, the transmit wavelength A, a number of and geometric arrangement of the physical transmit antennas 935, a number of and geometric arrangement of the physical receive antennas 940, the size and shape of each antenna, etc. The geometric arrangement can include spacings between each adjacent antenna.

The virtual antenna array 920 includes a plurality of virtual antennas spaced apart at a defined distance "d" that is λ/2 and one or more missing virtual antennas (designated as "X") may form "gaps" in the virtual antenna array 920. The gaps may be any integer multiple of λ/2 where the integer is greater than one. Because of the gaps, the virtual antenna array 920 may not have uniform phase consistency. More specifically, the virtual antenna array 920 has e.g., sparsity, irregular or inconsistent spacing between virtual antennas. This may be due to one or more of the physical transmit 935 and/or physical receive 940 antennas having a spacing between adjacent antennas that is not λ/2. In some embodiments the radar system 900 may not generate data for the virtual antenna array 920 and may use data directly from the physical antennas to generate data for the emulated antenna array 925.

Radar system 900 also includes a trained neural network 910. The neural network 910 may be or include any of the aspects, features, or characteristics of any of the neural networks previously described in the present disclosure. For example, the trained neural network 910 may be trained by training data formed from process 600 described above.

The trained neural network 910 can use data generated for the virtual antenna array 920 to generate data for an emulated antenna array 925. Optionally, the processor may not generate data for the virtual antenna array 920 and may directly generate the data for the emulated antenna array from the physical radar array 905. The neural network may generate a complete set of emulated antennas with no gaps or sparsity, where a defined distance "d" between each antenna of the emulated antenna array is λ/2. More specifically, any gaps or missing antennas that result due to non-λ/2 spacing in the physical radar array 905 are accommodated for by the neural network which generates data for a consistently spaced set of emulated antennas enabling angular calculations to be performed. The properties of the output data 930 depends on the training pattern applied to the neural network 910. The λ/2 spacing of the antennas in the emulated virtual array 925 can enable a maximized FOV e.g., ±900 for the radar system 900. The angular resolution and the unambiguous FOV of the uniformly spaced emulated antennas 925 may be enhanced in comparison to a FOV of the physical receive antennas 940 in the physical radar system 905. While ten emulated antennas 925 are depicted in FIG. 9, the array of uniformly spaced virtual antennas 920 can include any suitable number of virtual antennas. The number of virtual antennas 920 can be greater than, equal to, or less than the number of physical receive antennas 940 or physical transmitter antennas 935. Additionally, the number of virtual antennas 920 can be greater than, equal to, or less than the multiplication of the number of physical receive antennas 940 and the number of physical transmit antennas 935.

The output data 930 is produced from the uniformly spaced emulated antenna array 925. The output data 930 can include static and/or dynamic data associated with target objects that are sensed by the physical radar system 905. The static and/or dynamic data can include object's position, velocity, acceleration, etc. relative to an origin. The object can be either single or multiple having different locations, velocities, or shapes, etc. The origin can be a stationary point or a moving point, such as a fixed point on a moving vehicle that includes the physical radar system 905. The output data 930 can correspond to data associated with the physical radar system 905, such as data received by the physical receive antennas 940 and physical transmit antennas 935 of the physical radar system 905. The uniformly spaced virtual receive antennas 920 can produce output data 930 consistent with an enhanced unambiguous field of view in comparison to the field of view of the virtual antennas 945 of the physical radar system 905. The output data 930 can provide an angular resolution that is equivalent to or improved over the angular resolution of the virtual antennas 945.

In further embodiments, radar system 900 may operate similar to radar system 100 in which all antennas of the physical radar system have λ/2 spacing but in which there may be one or more gaps between adjacent antennas that is an integer multiple of λ/2 (e.g., where the integer is 2 or greater), however as compared to radar system 100 in which the neural network filled in the missing antennas, in this embodiment the neural network generates data for an complete emulated array of antennas, all with λ/2 spacing.

As appreciated by one of ordinary skill in the art having the benefit of this disclosure, in some embodiments, when the field of view of the radar system is greater than or less than 180 degrees, the optimal spacing between each antenna of the emulated array 925 of antennas may be greater than or less than λ/2 and may be referred to more generally as a "predetermined distance". For example, in one embodiment a desired field of view of the emulated array 925 is 120 degrees and therefore the optimal predetermined spacing between each antenna of the emulated antenna array is λ/3. Therefore, some embodiments may generate, using a neural network, data for an emulated array of antennas having a predetermined distance between each antenna of the emulated array of antennas. In various embodiments the predetermined distance may be λ/2 while in other embodiments the predetermined distance may be greater or less than λ/2.

Figure 10:
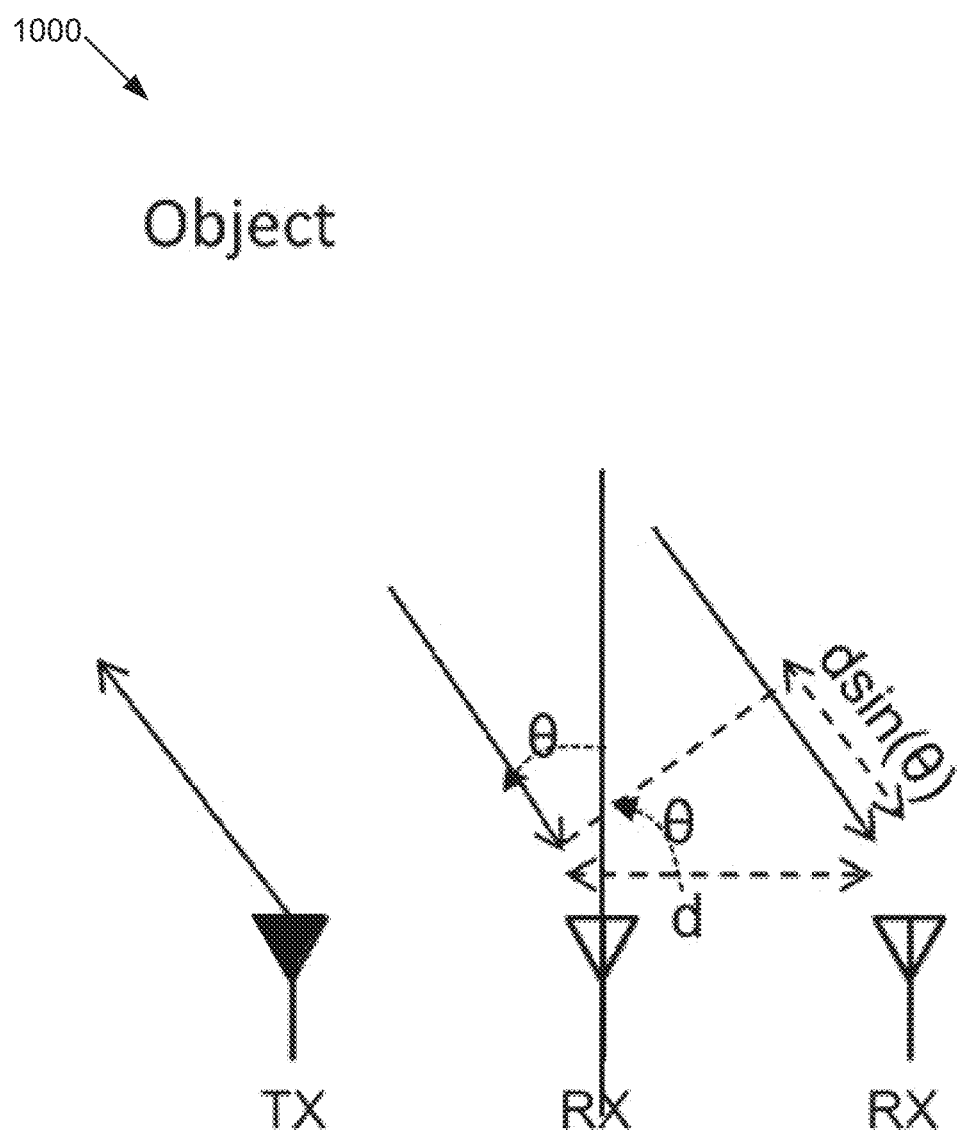
FIG. 10 illustrates a simplified diagram of a physical radar system 1000, according to embodiments of the disclosure.

FIG. 10 illustrates a simplified diagram of a traditional physical radar system 1000, according to embodiments of the disclosure. As shown in FIG. 10, several performance parameters of a traditional physical radar system 1000 are based on the wavelength dependent spacing d of receive antennas (e.g., λ/2), whereas embodiments of the current disclosure are not so limited, as described in more detail below. The total number of virtual antennas in FIG. 10 is 2, which is calculated by multiplying 1 transmit with 2 receive antennas. Generally, a minimum of two virtual antennas is needed to facilitate angle processing.

Two common performance parameters of radar systems are angular resolution and FOV, both dependent on the virtual and physical antenna spacing. Angular resolution can be a minimum angle between two different objects (ideally with same velocity and same range), in which the objects can be distinguished by a radar. Such angle resolution can be bounded by radar hardware and is traditionally dependent on a number of physical antennas used in the radar. A high radar resolution requirement traditionally leads to a larger size of hardware, additional circuitry, and increased costs. Further, traditional radar can suffer from poor angular resolution when designed under hardware constraints such as limiting the size of the receive antenna array. The FOV is the angular field that the radar can detect a target, e.g., ±900 and dependent on the spacing between antenna elements, but can be affected by ambiguity which happens at the edges of the FOV when traditional receive antennas are spaced apart at distances greater than λ/2. For traditional radar systems an optimal antenna spacing where phase ambiguity is minimal and field of view and angular resolution are maximized, is when each receiver is spaced apart from adjacent receivers by one-half of the radar wavelength, e.g., λ/2.

Under a conventional MIMO radar configuration, a target can be identified through several rounds of Discrete Fourier Transform (DFT) calculations, mostly for estimation of range, velocity, or angle. Under certain embodiments, they are commonly known as Fast Fourier Transform (FFT), velocity FFT, and angle FFT. Super resolution methods can use alternative techniques to populate angular information. Angle estimation can have a particular impact on accurate localization as the angle can be very sensitive to measurement inaccuracies about a location of the object. Even a small error in the angle estimation may cause a sizable estimation inaccuracy about the angle of the object.

Traditional radar systems typically design the physical receive antenna array based on the Nyquist criterion which requires a sampling rate to be at least twice the signal's maximum frequency to accurately sample a signal. In the context of Digital Signal Processing (DSP)-based angle processing for radar, the Nyquist criterion translates to spatial sampling in an antenna domain. In the angle domain, each virtual antenna element from a total of N elements, can acts as a sample of data. An antenna spacing can be designed based on a maximum FOV requested at a time of radar design. By spacing antennas at approximately λ/2 intervals, the field of view of the radar will be widest at ±90° and the radar system can adequately sample the spatial domain, reducing spatial aliasing and mitigating phase ambiguities. The maximum field of view that can be serviced, an unambiguous zone for angle measurement, specifies the optimal antenna spacing by the criterion depicted in FIG. 10, subject to d sin θ<λ/2, yielding equation (1):

$$\theta_{max} = \sin^{-1}\left(\frac{\lambda}{2d}\right) \quad (1)$$

where d is antenna spacing and $O_{max}$ indicates an unambiguous field of view. Anything out of this FOV can create measurement ambiguity for the radar system. Antennas spaced at $$d = \frac{\lambda}{2}$$

intervals maintain a widest FOV under a phase coherence across an array, which is ±90°. Such coherence can be important for coherent signal processing in MIMO radar systems, enabling accurate target detection with adequate angular information. A development of traditional signal processing towards angular information relies on antenna spacing requirements. From equation (1), antenna spacing cannot be smaller than λ/2. Furthermore, an antenna spacing of greater than λ/2 will limit the FOV. The term "λ/2-based spacing" used in this invention, refers to the cases where equation (1) is applicable, even though the spacing may be λ/2 or greater.

Although a larger antenna spacing can result in a smaller FOV, the larger spacing can also result in improved detection precision. Note that radar angular resolution is dependent on the total number of virtual antenna elements and spacings between the elements. A larger antenna spacing d will result in improved angular resolution according to equation (2):

$$\theta_{res} = \frac{\lambda}{Nd\cos\theta} \quad (2)$$

where θ is an angle of detected object relative to the radar, making radar angular resolution dependent on angle, and varying from object to object. A larger spacing thus improves resolution (smaller $\theta_{res}$), but at an expense of limiting the FOV. For θ=0 and d=λ/2, the angular resolution is 2/N, as previously stated.

In contrast, some of the radar systems disclosed herein do not adhere to traditional λ/2-based antenna spacing standards. For such systems, a FOV-dependent antenna spacing can be eliminated and equations (1) and (2) no longer apply. Antenna spacing in the radar systems disclosed herein can be smaller or larger than λ/2, without necessarily reducing the FOV. The antenna spacing can be independent of λ and cover a 180° FOV. An effective FOV for the radar systems may be independent of the antenna spacing. Some embodiments may have physical antennas that do not use λ/2-based spacing and may have a FOV of less than 180°.

In some embodiments, an angle processing methodology based on a neural network enables the radar system to operate. The neural network can deliver enhanced radar imaging characterized by a different angular resolution than traditional DSP processing which is limited by the Nyquist criterion. A number of physical or virtual antennas and spacing between antennas can depend on the application, specific use cases, and a target performance of a neural network design, among other factors.

Figure 11:
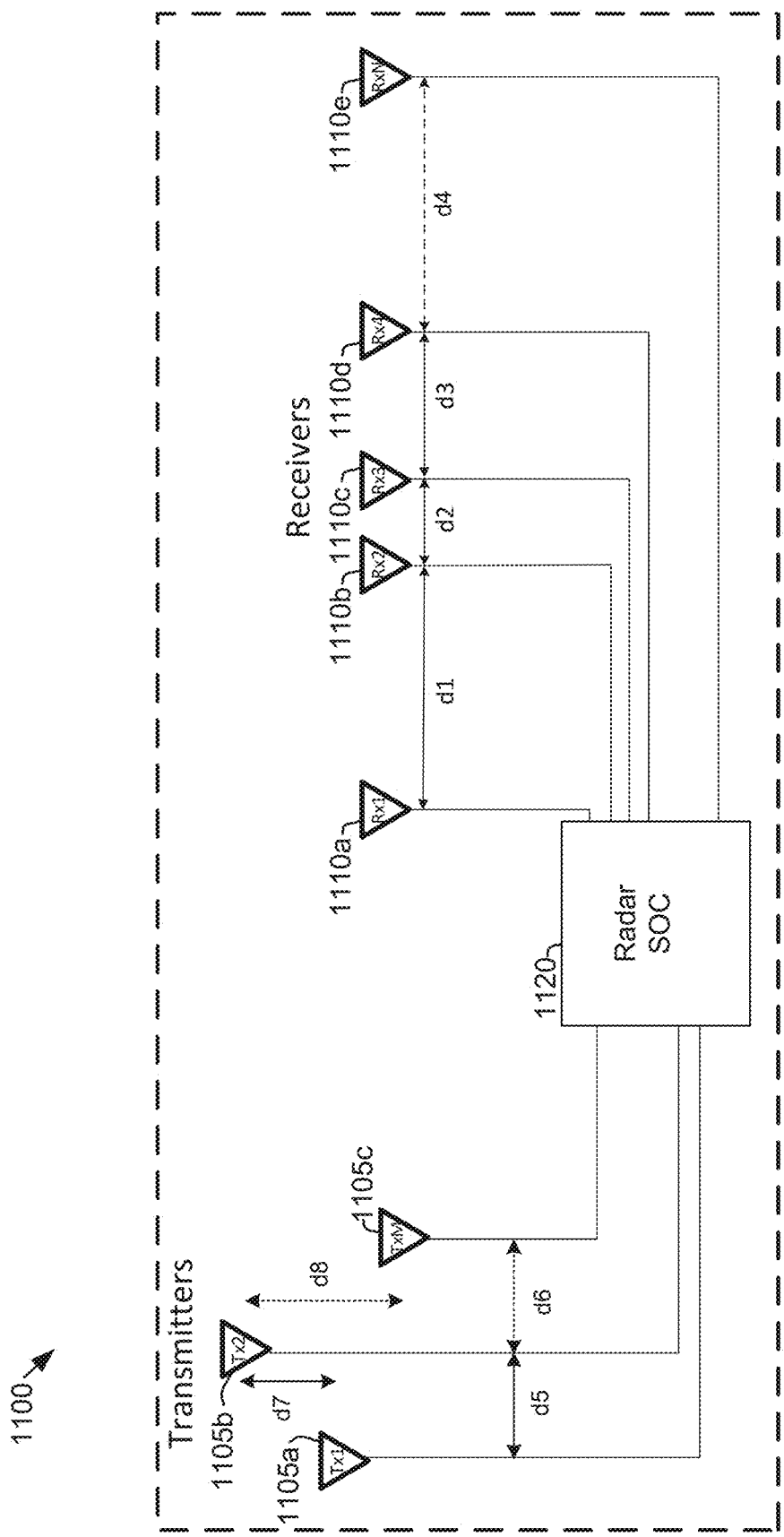
FIG. 11 is a simplified diagram of a physical radar system 1100 having non-$\lambda/2$-basedspacing between one or more physical transmit and/or one or more receive antennas, according to some aspects of the present disclosure.

FIG. 11 is a simplified diagram of a physical radar system 1100 having non-λ/2 spacing between one or more physical transmit and/or one or more receive antennas, according to some aspects of the present disclosure. Radar system 1100 may be or include any of the components, features, or characteristics of any of the radar systems previously described in the present disclosure. More specifically, physical radar system 1100 may be used in radar system 100 or 900 to provide both azimuth and elevation data. As shown in FIG. 11, the radar system 1100 includes three physical transmit antennas 1105 where Tx1 1105a and Tx2 1105b are separated in a horizontal direction by d5 and separated in a vertical direction by d7 and where Tx2 1105b and Tx3 1105c are separated in the horizontal direction by d6 and in the vertical direction by d8. In some embodiments at least one of distances d1-d8 are not equal to λ/2 (e.g., may be a integer multiple of λ/2 where the integer is not 1) and/or may be wavelength independent (e.g., a non-integer multiple of λ/2). The third physical transmit antenna TxM 1105c indicates that the radar system can include M total physical transmit antennas. While M is three in FIG. 11, M can have any suitable value.

Additionally, the radar system 1100 depicted in FIG. 11 includes five physical receive antennas where Rx1 1110a is separated from Rx2 1110b by d1, Rx3 1110c separated from Rx2 1110b by d2 and Rx4 1110d is separated from Rx3 1110c by d3. The fifth physical receive antenna RxN 1110e is separated from Rx 4 110d by d4 and indicates that the radar system can include N total physical receive antennas. While N is five in FIG. 11, N can be any suitable value, including M. In some embodiments at least one of d1-d4 are not equal to λ/2.

In some embodiments d5 and d6 are related to d1-d4. For example, in one embodiment d1-d6 have similar distances, e.g., 1.2λ/2. In another embodiment d1-d8 have similar distances, e.g., 1.3λ/2. In further embodiments only one of d1-d8 may not be λ/2. These and other permutations are within the scope of this disclosure, some of which are described in more detail below.

In general, spacings between physical receive antennas 1110 of the radar system 1100 can be defined as $d_i$ and spacings between the physical transmit antennas 1105 can be defined as $d_j$. Each of the physical receive antenna spacings can be described by an expression $$d_i = a_i\left(\frac{\lambda}{2}\right),$$

whereas the physical transmit antenna spacing components can be defined in a similar manner:

$$d_k = b_k\left(\frac{\lambda}{2}\right)$$

and $$d_j = b_j\left(\frac{\lambda}{2}\right).$$

The transmit antenna spacing components can be horizontal components or vertical components. The horizontal components $d_k$ can be useful for determining azimuthal angular data for an object, whereas the vertical components $d_j$ can assist in determining elevation angular data. The radar system 1100 can include several types of arrangements, such as (note: this is not an exhaustive list of all permutations which are within the scope of this disclosure):

Completely uniform wavelength independent spacing: (every nonzero $a_i$=every nonzero $b_k$=every nonzero $b_j$, where $a_i$, $b_k$, $b_j$ are all non-integer values)

Partially uniform wavelength independent spacing: (every nonzero $a_i$=every other nonzero $a_i$; where $a_i$ is a non-integer value OR every nonzero $b_k$=every other nonzero $b_k$; where $b_k$ is a non-integer value OR every nonzero $b_j$=every other nonzero $b_j$; where $b_j$ is a non-integer value)

Completely irregular wavelength independent spacing: (every nonzero $a_i$≠every other nonzero $a_i$; where $a_i$ is a non-integer value AND every nonzero $b_k$≠every other nonzero $b_k$; where $b_k$ is a non-integer value AND every nonzero $b_j$≠every other nonzero $b_j$; where $b_j$ is a non-integer value)

Partially irregular wavelength independent spacing: (every nonzero $a_i$=every other nonzero $a_i$; where $a_i$ is a non-integer value OR every nonzero $b_k$=every other nonzero $b_k$; where $b_k$ is a non-integer value OR every nonzero $b_j$=every other nonzero $b_j$; where $b_j$ is a non-integer value)

Mostly wavelength dependent spacing: (only one $a_i$ is a non-integer value OR only one $b_k$ is a non-integer value OR only one $b_j$ is a non-integer value)

Each physical transmit antenna 1105 and receive antenna 1110 is connected to a processor 1120 that controls each antenna and may more specifically control the transmission operations of the transmit antennas and the received data from the receive antennas. The processor 1120 may be or include any of the components, features, or characteristics of any of the processors previously described in the present disclosure. Processor 1120 may be any suitable processing system including but not limited to a system on a chip (SOC), a local and/or remote computing system or a combination of computing systems. The processor 1120 can include a machine learning model. The machine learning model can receive data from and associated with the radar system 100 to produce a virtual array of receive antennas that can produce output that is consistent with an array of physical receive antennas all with λ/2 spacing.

Figure 12:
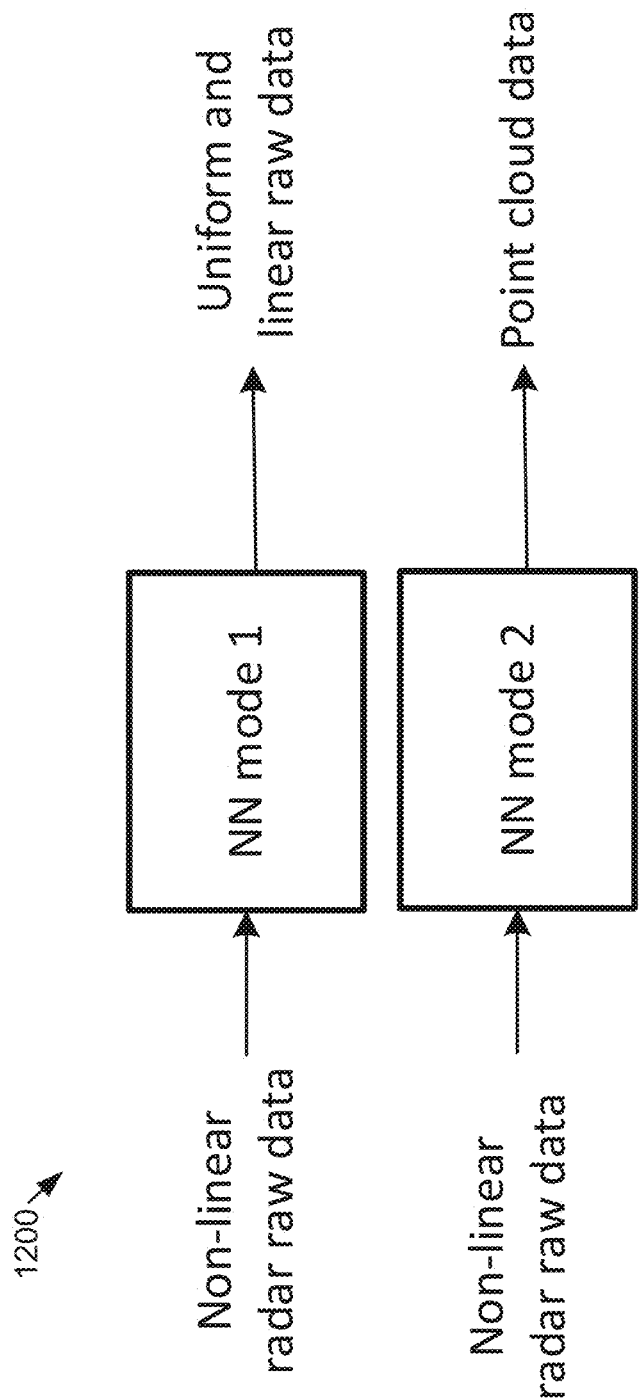
FIG. 12 is a simplified system diagram of two example modes of an algorithm that can be used by a processor to generate output data, according to some aspects of the present disclosure.

FIG. 12 is a simplified system diagram 1200 of two example modes of an algorithm that can be used by processor 1120 in FIG. 11 to generate output data, according to some aspects of the present disclosure. The algorithm can be a trained machine learning model or neural network that may be or include any of the components, features, or characteristics of any of the machine learning models previously described in the present disclosure. The neural network can receive non-uniform, non-linear data from a physical radar system and generate either raw data or radar point cloud data.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A radar system comprising:
   a physical radar array comprising:
      a plurality of physical transmit antennas, each configured to transmit a respective signal having a wavelength $\lambda$;
      a plurality of physical receive antennas, each configured to receive each of the respective signals; and
   a neural network configured to receive data from the physical radar array and generate data corresponding to an emulated array of antennas, wherein a defined distance between each antenna of the emulated array of antennas is $\lambda/2$.

2. The radar system of claim 1, wherein the neural network operates on a processor that is configured to generate data corresponding to a virtual antenna array having a defined distance between each virtual antenna that is inconsistent, and wherein the neural network uses the generated data corresponding to the virtual antenna array to generate the data corresponding to the emulated array of antennas.

3. The radar system of claim 1, wherein the neural network is trained via machine learning.

4. The radar system of claim 1, wherein at least two adjacent antennas of the plurality of physical receive antennas are spaced apart by a distance that is a non-integer multiple of $\lambda/2$.

5. The radar system of claim 1, wherein at least two adjacent antennas of the plurality of physical transmit antennas are spaced apart by a distance greater than $\lambda/2$.

6. The radar system of claim 1, wherein at least two adjacent antennas of the plurality of physical transmit antennas are spaced apart by a distance less than $\lambda/2$.

7. The radar system of claim 1, wherein at least two adjacent antennas of the plurality of physical receive antennas are spaced apart by a distance greater than $\lambda/2$.

8. The radar system of claim 1, wherein at least two adjacent antennas of the plurality of physical receive antennas are spaced apart by a distance less than $\lambda/2$.

9. A radar system comprising:
   a physical antenna array comprising:
      a plurality of physical transmit antennas, each configured to transmit a respective signal having a wavelength $\lambda$;
      a plurality of physical receive antennas, each configured to receive each of the respective signals; and
   a processor coupled to the physical antenna array and arranged to:
      generate data for a virtual antenna array using data received from the physical antenna array; and
      generate, using a neural network, data for an emulated array of antennas having a predetermined distance between each antenna of the emulated array of antennas, and wherein the neural network uses the data for the virtual antenna array.

10. The radar system of claim 9, wherein the virtual antenna array has a defined distance between each virtual antenna that is inconsistent.

11. The radar system of claim 9, wherein the predetermined distance is $\lambda/2$.

12. The radar system of claim 9, wherein at least two adjacent antennas of the plurality of physical transmit antennas are spaced apart by a distance greater than $\lambda/2$.

13. The radar system of claim 9, wherein at least two adjacent antennas of the plurality of physical transmit antennas are spaced apart by a distance less than $\lambda/2$.

14. The radar system of claim 9, wherein at least two adjacent antennas of the plurality of physical receive antennas are spaced apart by a distance greater than $\lambda/2$.

15. The radar system of claim 9, wherein at least two adjacent antennas of the plurality of physical receive antennas are spaced apart by a distance less than $\lambda/2$.

16. A method of operating a radar system, the method comprising:
   generating data from a physical antenna array, wherein the physical antenna array comprises:
      a plurality of physical transmit antennas, each configured to transmit a respective signal having a wavelength $\lambda$; and
      a plurality of physical receive antennas, each configured to receive each of the respective signals; and
   generating, using a neural network, data for an emulated array of antennas wherein a defined distance between each antenna of the emulated array of antennas is $\lambda/2$.

17. The method of claim 16, wherein the neural network operates on a processor that is configured to generate data corresponding to a virtual antenna array having a defined distance between each virtual antenna that is inconsistent.

18. The method of claim 17, wherein the data corresponding to the virtual antenna array is used by the neural network to generate the data corresponding to the emulated array of antennas.

19. The method of claim 16, wherein the neural network is trained via machine learning.

20. The method of claim 16, wherein at least two adjacent antennas of the plurality of virtual receive antennas are spaced apart by a distance that is not $\lambda/2$.

\* \* \* \* \*